US006815850B2

United States Patent
Albrecht et al.

(10) Patent No.: US 6,815,850 B2
(45) Date of Patent: Nov. 9, 2004

(54) FLUX LEAKAGE BARRIER IN FLUID BEARING FOR DISK DRIVE

(75) Inventors: David W. Albrecht, San Jose, CA (US); Chen-hsiung Lee, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 185 days.

(21) Appl. No.: 09/902,310

(22) Filed: Jul. 10, 2001

(65) Prior Publication Data

US 2003/0011251 A1 Jan. 16, 2003

(51) Int. Cl.[7] .......................... H02K 21/22; H02K 5/16; G11B 17/02
(52) U.S. Cl. .................. 310/67 R; 310/89; 310/90; 310/43; 310/266; 310/254; 360/98.07; 360/99.08; 369/266; 369/269; 384/107
(58) Field of Search .................. 310/67 R, 89, 310/43, 90, 266, 254; 360/98.07, 99; 384/107–120; 369/266, 269

(56) References Cited

U.S. PATENT DOCUMENTS

| | | | |
|---|---|---|---|
| 4,656,545 A | | 4/1987 | Kakuta |
| 4,717,977 A | | 1/1988 | Brown |
| 4,734,606 A | | 3/1988 | Hajec |
| 5,091,809 A | | 2/1992 | Connors et al. |
| 5,148,338 A | | 9/1992 | Frugé |
| 5,160,865 A | | 11/1992 | Gururangan |
| 5,323,076 A | | 6/1994 | Hajec |
| 5,328,272 A | * | 7/1994 | Ainslie et al. ............ 384/112 |
| 5,579,188 A | * | 11/1996 | Dunfield et al. ......... 360/99.08 |
| 5,634,724 A | * | 6/1997 | Zang et al. ................ 384/107 |
| 5,678,929 A | | 10/1997 | Parsoneault et al. |
| 5,684,352 A | * | 11/1997 | Mita et al. ................. 310/152 |
| 5,697,708 A | | 12/1997 | Leuthold et al. |
| 5,763,967 A | | 6/1998 | Kurosawa et al. |
| 5,896,241 A | * | 4/1999 | Hilton et al. ................ 360/135 |
| 5,907,456 A | | 5/1999 | Khan et al. |
| 6,005,746 A | | 12/1999 | Papst |
| 6,133,655 A | * | 10/2000 | Suzuki et al. ................. 310/43 |
| 6,250,808 B1 | * | 6/2001 | Ichiyama ..................... 384/100 |
| 6,300,695 B1 | * | 10/2001 | Neal ......................... 310/68 D |
| 6,339,270 B1 | * | 1/2002 | Ichiyama ................... 310/67 R |
| 6,456,458 B1 | * | 9/2002 | Ichiyama ................. 360/99.08 |
| 6,493,181 B1 | * | 12/2002 | Ichiyama ................. 360/99.08 |
| 6,549,366 B1 | * | 4/2003 | Ichiyama ................. 360/97.03 |
| 6,608,734 B1 | * | 8/2003 | Herndon et al. ......... 360/99.08 |

FOREIGN PATENT DOCUMENTS

| | | |
|---|---|---|
| JP | 61077165 A | 4/1986 |
| JP | 61112547 A | 5/1986 |
| JP | 63158317 A | 7/1998 |
| JP | 2001076459 A * 3/2001 | ........... G11B/25/04 |

OTHER PUBLICATIONS

"Improved Low–Cost Oil Bearing Spindle For Hard Disk Drive," IBM Technical Disclosure Bulletin, vol. 38, No. 06, Jun. 1995, p. 325–327.

* cited by examiner

Primary Examiner—Burton S. Mullins
Assistant Examiner—Jaydi A. Aguirrechea
(74) Attorney, Agent, or Firm—Robert B. Martin; Dillon & Yudell LLP

(57) ABSTRACT

A spindle design for a hard disk drive assembly constructed in accordance with the present invention includes a significantly large gap between the rotating, ferromagnetic hub with its permanent magnet rotor and the rotating sleeve of the fluid bearing journal member. The large gap may be filled with a medium, such as air, or a non-permeable material. The large gap is preferably on the order of several hundred microns. Because of the large gap, the magnetic flux leakage from the rotating hub members and sleeve into the stationary shaft at the center of the spindle is negligible. Consequently, iron loss in the shaft caused by magnetic flux leakage into the shaft is reduced to acceptable noise levels.

6 Claims, 5 Drawing Sheets

FLUX LEAKAGE BARRIER IN FLUID BEARING FOR DISK DRIVE

BACKGROUND OF THE INVENTION

1. Technical Field

The present invention relates in general to an improved bearing for a disk drive, and in particular to an improved fluid journal bearing for a disk drive spindle.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, two or three disks are stacked vertically on a common spindle that is turned by a disk drive motor at several thousand revolutions per minute (rpm).

The only other moving part within a typical HDD is the actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions (air bearing design) on its air bearing surface (ABS) that enables the slider to fly at a constant height close to the disk during operation of the disk drive. In general, a slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk.

When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop directly over the desired track.

In the past, the spindle bearing system in a disk drive has typically used ball bearings. This type of rotary bearing system produces non-repeatable radial runout (NRRO) motion of the disk that adversely affects the ability of the actuator to precisely locate and position the slider and magnetic read/write head over the data track on the disk. As disk drives are implementing ever-increasing track densities, or reduced spacing track to track, it is desirable to replace ball bearing spindles with fluid dynamic bearing (FDB) spindles that have essentially no NRRO motion. In a hydrodynamic FDB spindle, the rotating journal sleeve rotates very precisely about a stationary cylinder on a thin pressurized fluid film much in the same way the slider flies over the disk. This fluid may be air or any other appropriate viscous fluid such as oil.

One type of journal bearing makes use of ferromagnetic materials, such as 440 stainless steel, in the bearing surfaces. For example, FIGS. 2 and 3 illustrate a sectional side elevation and sectional end view of a conventional fluid bearing spindle 11 in a disk drive. Spindle 11 has a stationary shaft 13 and a sleeve 15. A small fluid bearing gap 16, typically air, is formed between sleeve 15 and shaft 13 (on the order of a few microns), such that sleeve 15 is rotatable with respect to shaft 13. A ferromagnetic hub 17 is bound to sleeve 15, such as by shrink fit or adhesive bond. In addition, rotor magnets 19 (alternately radially poled) are bound to an exterior of hub 17, which are spaced apart from a circumferential stator/windings 21. The large curved arrows 23 represent return flux paths from magnets 19.

Even though the fluid medium of bearing gap 16 has a magnetic permeability that is thousands of times greater than that of the materials used to form shaft 13 and sleeve 15, the reluctance of gap 16 is on the same order of magnitude as shaft 13 or sleeve 15 because gap 16 is so small. As a result, the magnetic flux in rotating hub 17 and sleeve 15 can leak into stationary shaft 13, resulting in a large braking effect and, thus, substantial iron loss in shaft 13. Thus, an improved disk drive spindle design which overcomes these problems is needed.

SUMMARY OF THE INVENTION

One embodiment of a spindle design for a disk drive actuator assembly constructed in accordance with the present invention includes a significantly large radial gap between the rotating, ferromagnetic hub and rotating sleeve of the fluid bearing spindle. The large gap may be filled with a medium, such as air, or any other non-permeable material. The large gap is preferably on the order of several hundred microns. Because of the large gap, the magnetic flux leakage from the rotating journal sleeve into the stationary shaft at the center of the spindle is negligible. Consequently, iron loss in the shaft caused by magnetic flux leakage into the shaft is reduced to acceptable noise levels.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE PREFERRED EMBODIMENT OF THE PRESENT INVENTION

Figure 1:
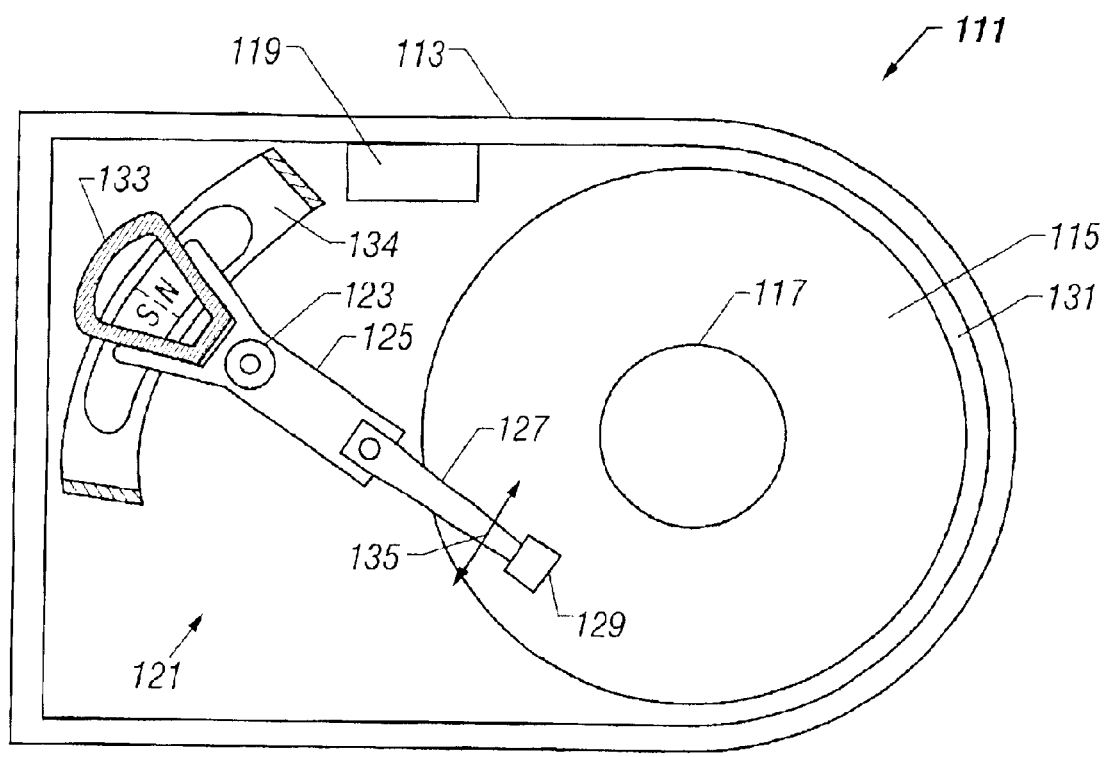
FIG. 1 is a plan view of a disk drive assembly with a cover removed to show the principle subassembly.
Figure 2:
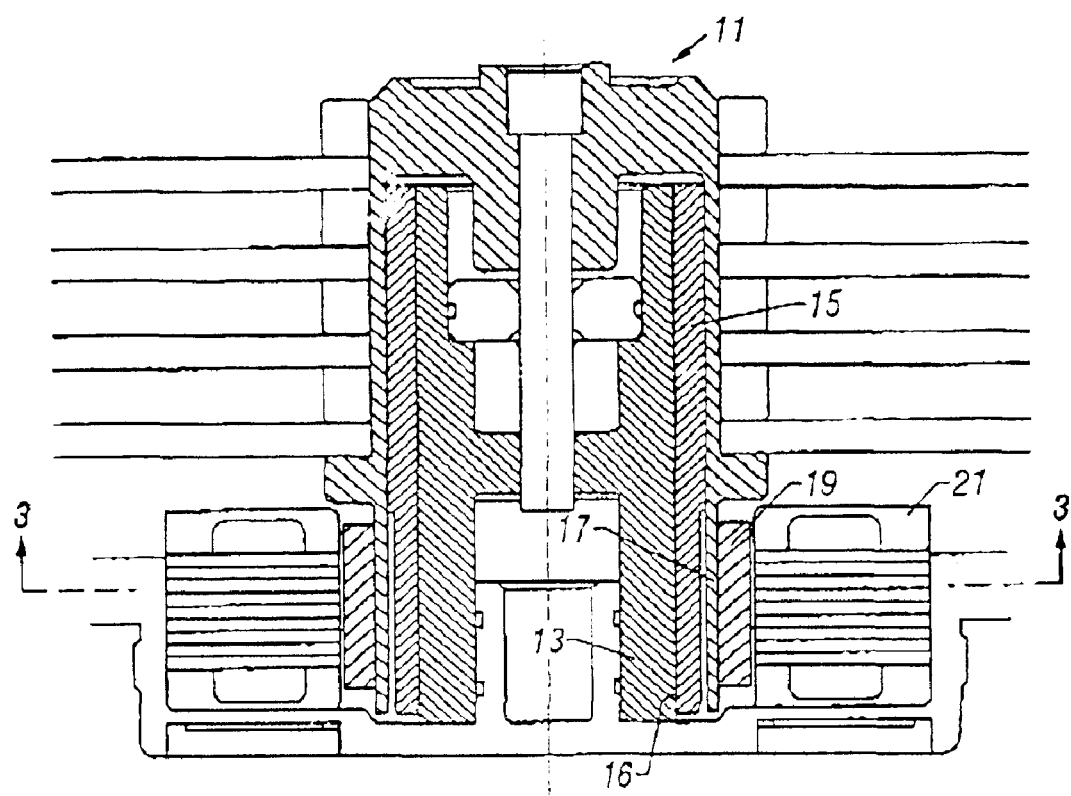
FIG. 2 is a sectional side view of a prior art disk drive spindle.
Figure 3:
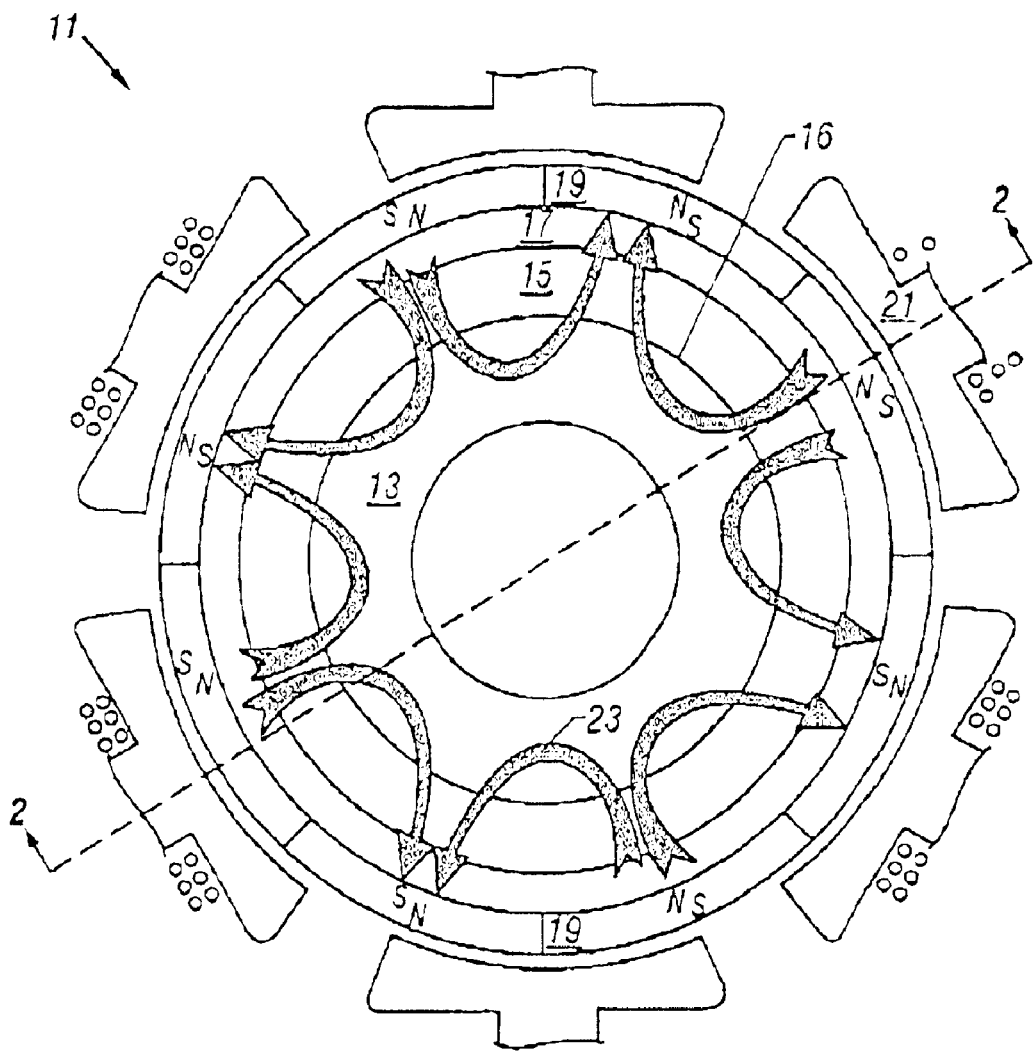
FIG. 3 is a sectional end view of the disk drive spindle of FIG. 2 taken along the line 3—3 of FIG. 2.

Referring to FIG. 1, a schematic drawing of one embodiment of an information storage system comprising a magnetic hard disk file or drive 111 for a computer system is shown. Drive 111 has an outer housing or base 113 containing a plurality of stacked, parallel magnetic disks 115 (one shown) which are closely spaced apart. Disks 115 are rotated by a spindle motor assembly 131 having a central drive hub 117. An actuator 121 comprises a plurality of stacked, parallel actuator arms 125 (one shown) in the form of a comb that is pivotally mounted to base 113 about a pivot assembly 123. A controller 119 is also mounted to base 113 for selectively moving the comb of arms 125 relative to disks 115.

In the embodiment shown, each arm 125 has extending from it at least one cantilevered load beams or suspensions 127, a magnetic read/write transducer or head 129 mounted on a slider secured to a flexure that is flexibly mounted to each suspension 127. The read/write heads 129 magnetically read data from and/or magnetically write data to disks 115. The level of integration called the head gimbal assembly is the head 129 and slider mounted on suspension 127. Suspensions 127 have a spring-like quality which biases or urges the slider against the disk to enable the creation of the air bearing film between the slider and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves head gimbal assemblies 129 radially across tracks on the disks 115 until the heads 129 settle on the target tracks. The head gimbal assemblies operate in a conventional manner and always move in unison with one another, unless drive 111 uses multiple independent actuators (not shown) wherein the arms can move independently of one another.

Figure 4:
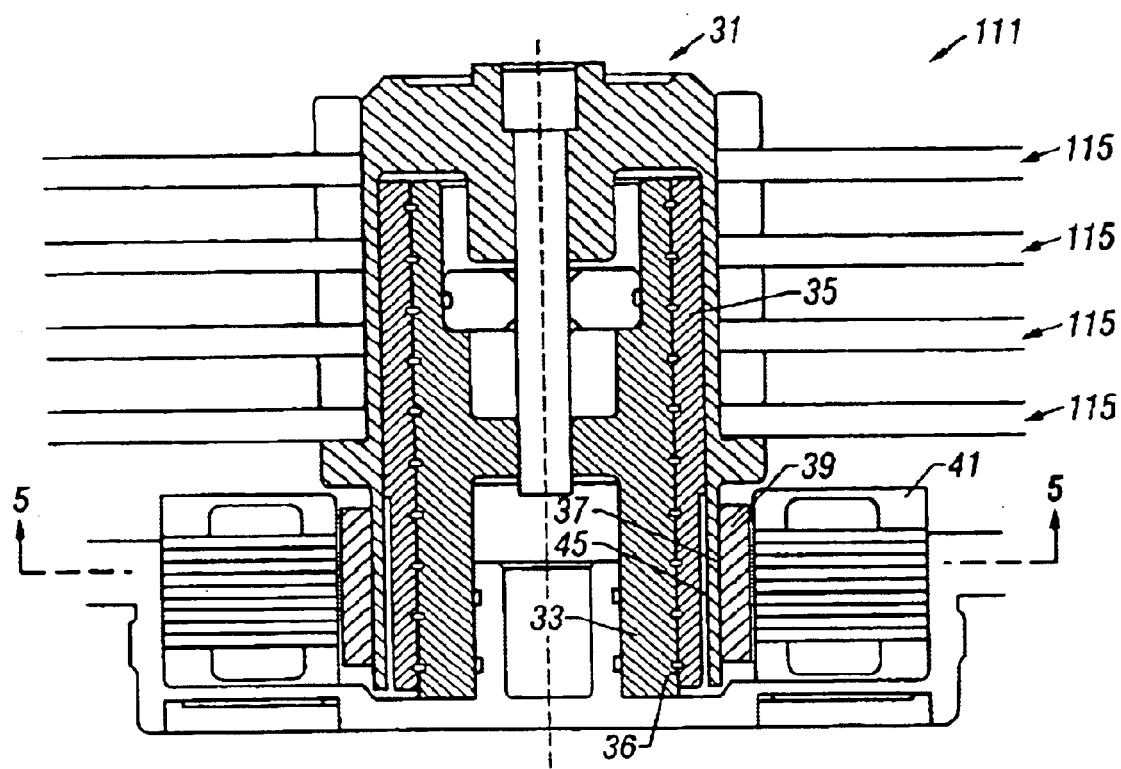
FIG. 4 is a sectional side elevation of one embodiment of a disk drive spindle constructed in accordance with the present invention.
Figure 5:
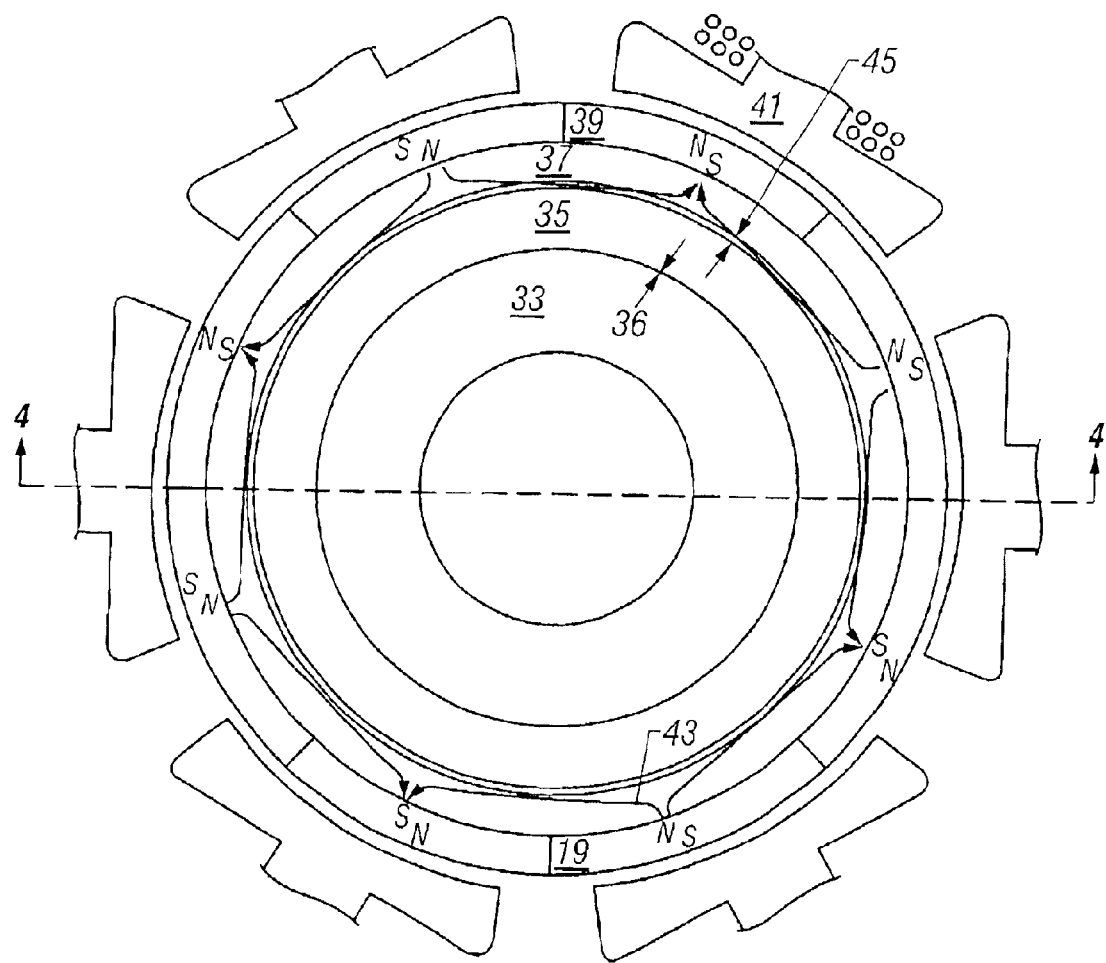
FIG. 5 is a sectional end view of the disk drive spindle of FIG. 4 taken along the line 5—5 of FIG. 4.

Referring now to FIGS. 4 and 5, one embodiment of a precision spindle motor assembly 31 for disk drive assembly 111 constructed in accordance with the present invention, insulates the stationary components of the spindle bearing system from magnetic flux. Spindle motor assembly 31 utilizes a plurality of components which closely receive and are coaxial with each other, including journal bearing members 33, 35 that facilitate rotational motion. The journal bearing in spindle 31 has a shaft 33 and a sleeve 35, one of which is rotatable relative to the other. In the embodiment shown, shaft 33 is stationary and sleeve 35 is movable.

A small, radial, fluid bearing gap 36 (on the order of a few microns) is formed between sleeve 35 and shaft 33, to allow sleeve 35 to have precision rotation with respect to shaft 33. A pattern of very shallow groove features (shown schematically and greatly exaggerated) may be incorporated on one of the surfaces defining gap 36 to facilitate the hydrodynamic generation of a fluid film of high pressure and stiffness. The surfaces of the journal bearing are formed from ferromagnetic materials, such as 440 stainless steel. A ferromagnetic hub 37 is bound to sleeve 35, such as by shrink fit or adhesive bond. In addition, rotor magnets 39 are bound to an exterior of hub 37, which are spaced apart from a circumferential stator/windings 41.

Spindle 31 is also provided with a significantly large gap 45 between the rotating, ferromagnetic hub 37 and sleeve 35 of the assembly. In alternate embodiments, gap 45 can be filled with any substantially non-permeable material, such as epoxy. The large gap 45 is preferably on the order of several hundred microns. Ideally, gap 45 will be in the range of 200 to 300 microns. Because of the large gap 45, the magnetic flux leakage into rotating sleeve 35 is very small. Then, only a small, practically negligible fraction of that small amount of flux crosses gap 36 into stationary shaft 33 at the center of spindle 31. Curved arrows 43 contained within hub 37 now represent the principle return flux paths from magnets 39. Consequently, iron loss in shaft 33 caused by magnetic flux leakage of rotor magnets 39 into shaft 33 is reduced to acceptable noise levels.

The present invention has several advantages. Because of the large gap between the magnetic return member for the rotor magnets and the rotating journal bearing member in the spindle, the magnetic flux leakage into the stationary shaft at the center of the spindle is negligible. Consequently, iron loss in the shaft caused by magnetic flux leakage into the shaft is reduced to acceptable noise levels. The majority of the magnetic flux from the rotor magnets is contained within the hub by the large gap or non-permeable material gap. As a result, it does not leak into the rotating member of the journal bearing, and therefore cannot leak across the small fluid bearing gap into the stationary shaft. This configuration eliminates the prior art problem of substantial iron loss in the stationary shaft that is manifested as a braking effect.

The spindle motor assembly 31 constructed in accordance with the present invention has been shown as applied to a hard disk drive, but is not limited to this application. Furthermore, the present invention has been shown or described in only some of its forms. It should be apparent to those skilled in the art that it is not so limited, but is susceptible to various changes without departing from the scope of the invention.

What is claimed is:

1. A spindle, comprising:

a shaft;

a sleeve coaxial with the shaft;

a first gap formed between the sleeve and the shaft for facilitating rotation therebetween;

a hub bound to the sleeve;

a second gap located between the hub and the sleeve, the second gap being larger than the first gap; wherein the hub is secured to a rotor magnet which is adjacent to a stator, such that the second gap reduces magnetic flux leakage into the sleeve and a substantially negligible amount of flux crosses the first gap into the shaft; and wherein the second gap is filled with epoxy.

2. A spindle, comprising:

a shaft;

a sleeve coaxial with the shaft;

a first gap formed between the sleeve and the shaft for facilitating rotation therebetween;

a hub bound to the sleeve;

a second gap located between the hub and the sleeve, the second gap being larger than the first gap; wherein the hub is secured to a rotor magnet which is adjacent to a stator, such that the second gap reduces magnetic flux leakage into the sleeve and a substantially negligible amount of flux crosses the first gap into the shaft; and wherein the second gap is in the range of 200 to 300 microns.

3. A precision spindle assembly, comprising in combination:

a stator;

a spindle hub having a rotor magnet mounted thereto that is rotatable relative to the stator; wherein the spindle hub comprises:

a ferromagnetic stationary shaft;

a rotatable ferromagnetic sleeve coaxial with the shaft;

a fluid bearing gap formed between the sleeve and the shaft for facilitating rotation therebetween;

a ferromagnetic hub bound to the sleeve;

a large gap located between the hub and the sleeve, wherein the large gap is larger than the fluid bearing gap and is in the range of 200 to 300 microns; and a substantially non-permeable material filling the large gap in order to reduce magnetic flux leakage into the sleeve such that a substantially negligible amount of flux crosses the fluid bearing gap into the shaft.

4. The precision spindle assembly of claim 3 further comprising a pattern of shallow groove features incorporated on one of the shaft and the sleeve to facilitate hydrodynamic generation of a fluid film of high pressure and stiffness.

5. A method of insulating a precision spindle assembly against magnetic flux, comprising the steps of:

(a) providing a stator, and a spindle assembly with a rotor magnet, a shaft, a sleeve, a fluid bearing gap between the sleeve and the shaft, a hub on one of the shaft and the sleeve, and a gap between the hub and the sleeve;

(b) rotating the rotor magnet relative to the stator to induce a magnetic field;

(c) reducing magnetic flux leakage into the sleeve with the gap such that a substantially negligible amount of flux crosses the fluid bearing gap into the shaft; and wherein step (a) comprises filling the gap with an epoxy.

6. A method of insulating a precision spindle assembly against magnetic flux, comprising the steps of:

(a) providing a stator, and a spindle assembly with a rotor magnet, a shaft, a sleeve, a fluid bearing gap between the sleeve and the shaft, a hub on one of the shaft and the sleeve, and a gap between the hub and the sleeve;

(b) rotating the rotor magnet relative to the stator to induce a magnetic field;

(c) reducing magnetic flux leakage into the sleeve with the gap such that a substantially negligible amount of flux crosses the fluid bearing gap into the shaft; and wherein step (a) comprises forming the gap in the range of 200 to 300 microns.

* * * * *